(12) United States Patent
Wood

(10) Patent No.: US 6,520,117 B1
(45) Date of Patent: Feb. 18, 2003

(54) COMBINATION AQUARIUM AND TERRARIUM

(76) Inventor: Bob Francis Wood, 41565 Corte Seda, Temecula, CA (US) 92592

(*) Notice: Subject to any disclaimer, the term of this patent is extended or adjusted under 35 U.S.C. 154(b) by 0 days.

(21) Appl. No.: 09/692,767

(22) Filed: Oct. 18, 2000

Related U.S. Application Data

(63) Continuation-in-part of application No. 09/320,743, filed on May 27, 1999, now Pat. No. 6,176,202.

(51) Int. Cl.[7] ............................................. A01K 63/00
(52) U.S. Cl. ...................................................... 119/246
(58) Field of Search ................................ 119/246, 247, 119/248, 251, 256; D30/104, 105

(56) References Cited

U.S. PATENT DOCUMENTS

| | | | |
|---|---|---|---|
| 3,893,421 A | * 7/1975 | Dinnerstein | 119/269 |
| 5,445,112 A | * 8/1995 | Grosman | 119/265 |
| 5,447,123 A | * 9/1995 | Hendrickson | 119/249 |
| 6,029,604 A | * 2/2000 | de Vosjoli et al. | 119/246 |

* cited by examiner

*Primary Examiner*—Charles T Jordan
*Assistant Examiner*—Yvonne R. Abbott

(57) ABSTRACT

A combination aquarium and terrarium comprising a standard ten-gallon aquarium tank containing water, a physically smaller terrarium and a containment lid. Standard ten-gallon aquarium tanks include a channel shaped band and a channel lip facing the interior of the tank. The terrarium is configured so that, when placed in the tank, the top edges of the terrarium will be positioned between the channel shaped band and the channel lip. A containment lid is provided that mounts on the top side of the channel lip, thereby depressing the terrarium. This downward pressure acts in conjunction with the buoyancy of the terrarium to fix the terrarium in place. An alternate embodiment is composed of two rigid clips, separately mounted on opposing top edges of the terrarium and secured in place by compressive force. Each clip includes a tab that projects outward from the side of the terrarium. When the terrarium is placed within the aquarium, the buoyancy of the terrarium causes the projecting tab to abut against the channel lip, thereby fixing the terrarium in place within the aquarium.

8 Claims, 4 Drawing Sheets

COMBINATION AQUARIUM AND TERRARIUM

This application is a Continuation-in-Part of Ser. No. 09320743, filed on May 27, 1999, which is now U.S. Pat. No. 6,176,202.

BACKGROUND OF THE INVENTION

1) Field of the invention

The present invention relates generally to small transparent enclosures found in the home such as aquariums and terrariums and more specifically to a standard tengallon aquarium tank and a physically smaller terrarium which is secured within the aquarium to provide a simultaneous viewing of marine and terrestrial life.

2) Description of the Prior Art

U.S. Pat. No. 4,176,620 shows an aquarium including an obliquely angled transparent ledge mounted within, providing thereby a water-free area that functions as a terrarium.

U.S. Pat. No. 5,357,903 shows a terrarium that is completely submerged within an aquarium. The patent further describes a life support system for plants contained within the terrarium.

Accordingly, one object and advantage of the present invention is to provide a system in which the terrarium may be easily removed for cleaning and maintenance.

Another object and advantage of this invention is that small animals may be safely and humanely contained within the terrarium.

Another object and advantage of this invention is that terrariums of various sizes and configurations may be freely interchanged within the aquarium.

Further objects and advantages of this invention will become apparent from consideration of the drawings and ensuing description of it.

SUMMARY OF THE INVENTION

The present invention comprises a standard ten-gallon aquarium tank containing water, a physically smaller terrarium that is positioned within the aquarium tank, and a containment lid.

The four sides of a standard ten-gallon aquarium tank are secured at the top by a channel shaped band that defines the perimeter of the tank. The lower surface of the channel facing the inside of the tank terminates in a projection, henceforth called the lip, which is perpendicular to each side of the tank and encompasses the interior surface of the tank.

A judicious placement of soil, gravel, rocks, plants, and small animals will cause the terrarium to overcome the natural tendency to float, but not swamp, so that the top edges of the terrarium are positioned in the region defined by the top of the channel shaped band and the channel lip when the terrarium is placed in the aquarium.

The containment lid is dimensioned to be mounted on the top surface of the channel lip, thereby depressing the terrarium. Latches are provided to secure the containment lid in place. The buoyancy of the terrarium and the surface friction of the containment lid cooperate to fix the terrarium in place within the aquarium tank. The containment lid further comprises at least one aperture, spanned by a fine mesh screen, to provide ventilation. The fine mesh screen is configured so that it may be opened to facilitate maintenance and life support activities for the terrestrial life. An access hatch is incorporated in the containment lid to facilitate maintenance and life support activities for the marine life.

An alternate embodiment is composed of two rigid clips, separately mounted on opposing top edges of the terrarium and secured in place by compressive force. Each clip further includes a tab that projects at right angles away from the outer vertical side of the terrarium. Each projecting tab comprises a flat surface that is parallel to the top of the terrarium.

When the terrarium is placed within the aquarium, the buoyancy of the terrarium causes the upper surface of each projecting tab to abut against the lower surface of the channel lip, thereby fixing the terrarium in place within the aquarium.

DESCRIPTION OF THE PREFERRED EMBODIMENT

Figure 1:
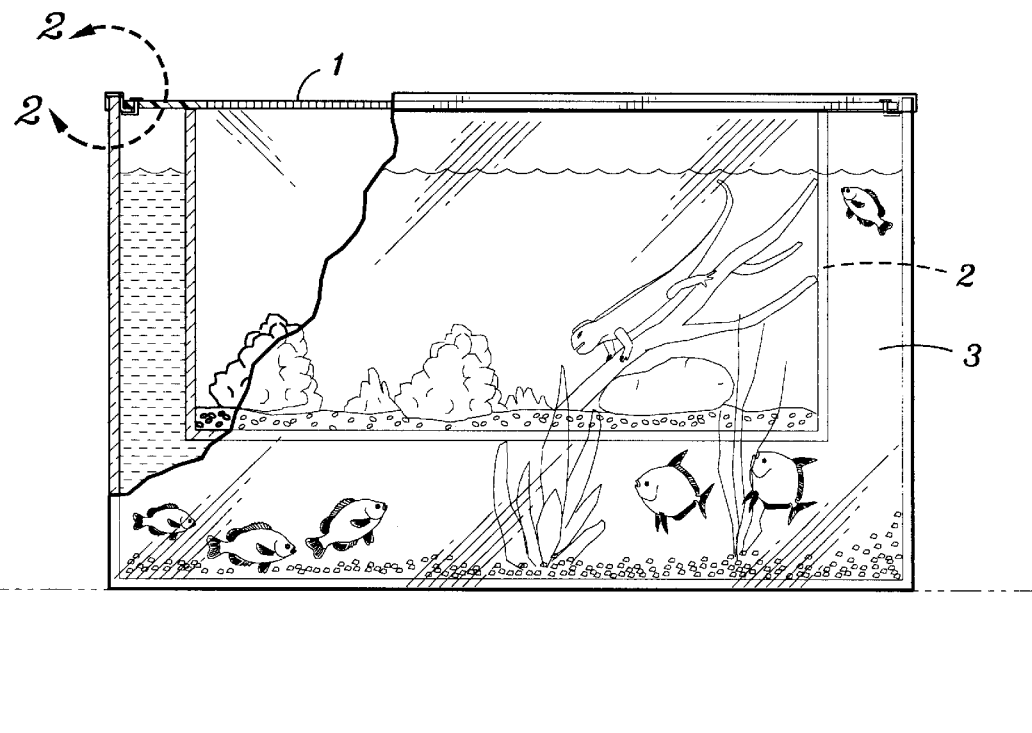
FIG. 1 shows a frontal view of a combination aquarium and terrarium. In this view, the relationship between the containment lid 1, the terrarium 2, and the aquarium tank 3, may be clearly seen.

FIG. 1 shows a standard ten-gallon aquarium tank 3 containing water and configured as a habitant for marine life.

Figure 2:
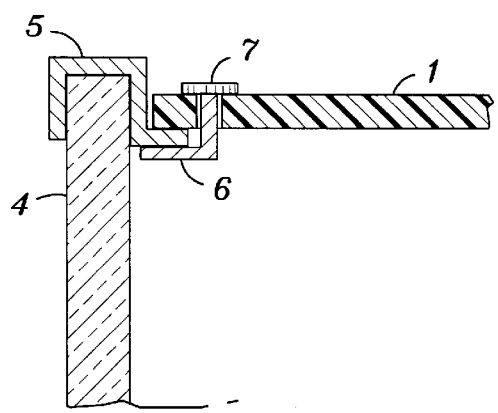
FIG. 2 shows a cutaway view of a typical side 4 of the aquarium tank 3, the channel shaped band 5, the containment lid 1, a typical latch 6, and a latch thumbnut 7. As may be seen, the lower surface of the band facing the inside of the tank terminates in a channel lip, which is perpendicular to each side of the tank
Figure 3:
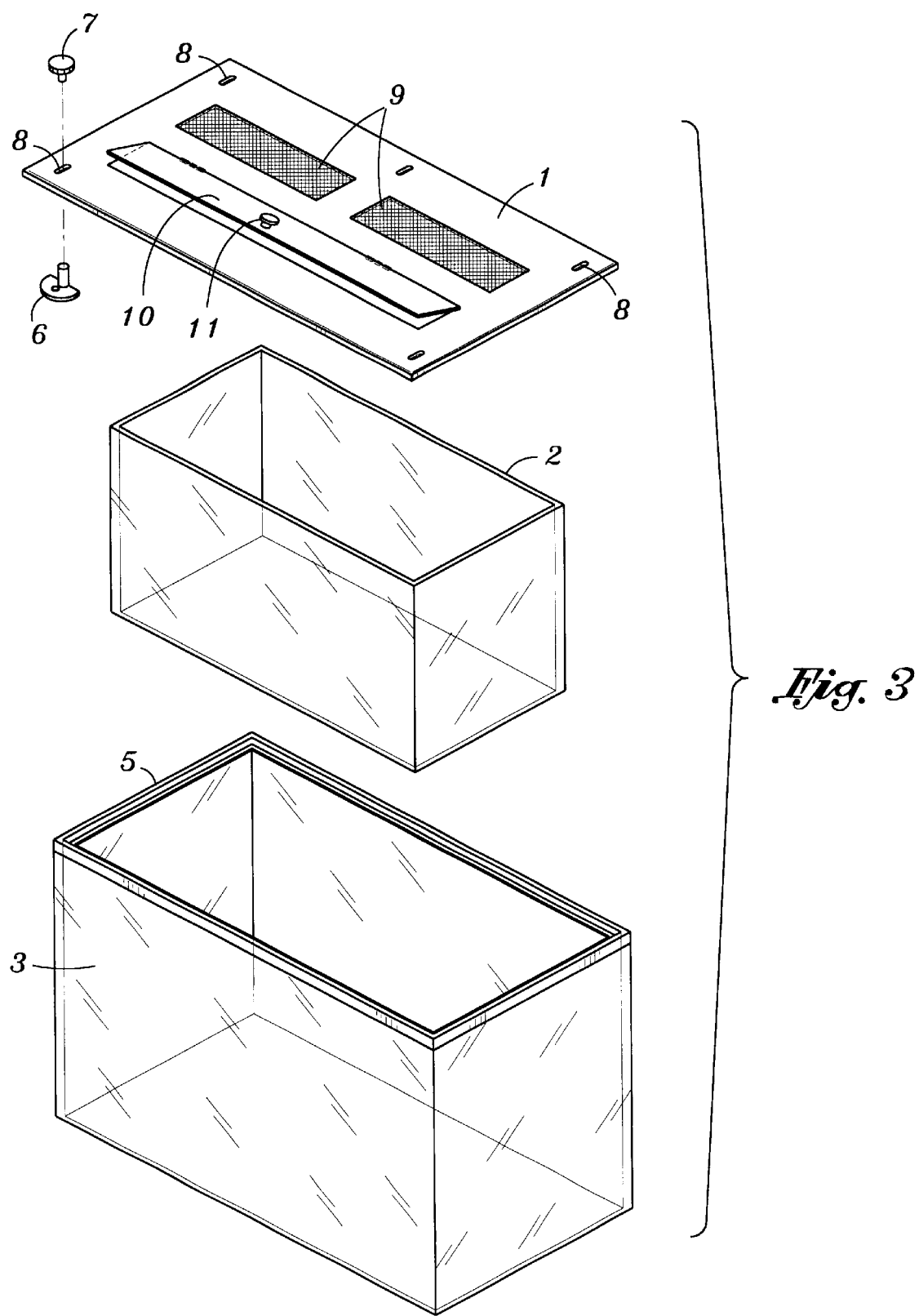
FIG. 3 shows an exploded view of the combination that more clearly illustrates features of the containment lid 1. Here, slots 8 that accommodate latches 6 and thumbnuts 7 are visible. Two fine mesh covered ventilation apertures 9 are shown along with the access hatch 10 and access hatch handle 11. Also in this view, the manner in which the channel shaped band 5 defines the perimeter of the aquarium tank 3 is demonstrated.

As seen in FIG. 2, standard ten-gallon aquarium tanks are characterized by a channel shaped band 5 that envelops and secures the top of the tank. The lower surface of the channel shaped band facing the interior of the tank terminates in a projection, or channel lip, which is perpendicular to each side of the tank. FIG. 3 shows how the channel shaped band defines the perimeter of the tank.

FIG. 1 also shows a terrarium 2 configured as a habitant for terrestrial life. The contents of the terrarium have been carefully chosen so that, when the terrarium is placed within the aquarium, the buoyancy of the terrarium will cause the top edges of the terrarium to be positioned within the limits defined by the channel lip and the top of the channel shaped band.

FIG. 2 shows how the rectangularly shaped containment lid 1, is dimensioned to be mounted on the top surface of the channel lip. Initially, as illustrated in FIG. 3, all latches 6 are retracted to the rear of their respective slots 8 so that the latches do not protrude beyond the edges of the containment lid. When the containment lid is presented to the channel lip, the latches are pressed forward under the channel lip and locked in place with thumbnuts 7 as shown in FIG. 2. So positioned, the containment lid exerts a downward force on the buoyant terrarium. The buoyancy of the terrarium and the downward force of the containment lid cooperate to secure the terrarium in place within the aquarium tank.

The containment lid further comprises at least one ventilation aperture 9, which is spanned by a fine mesh screen. The fine mesh screen is configured so that it may be opened to facilitate maintenance and life support activities for the terrestrial life.

Also incorporated in the containment lid is an access hatch 10 with attendant access hatch handle 11. The hatch allows entry to the aquarium for maintenance and life support activities for the marine life.

Figure 4:
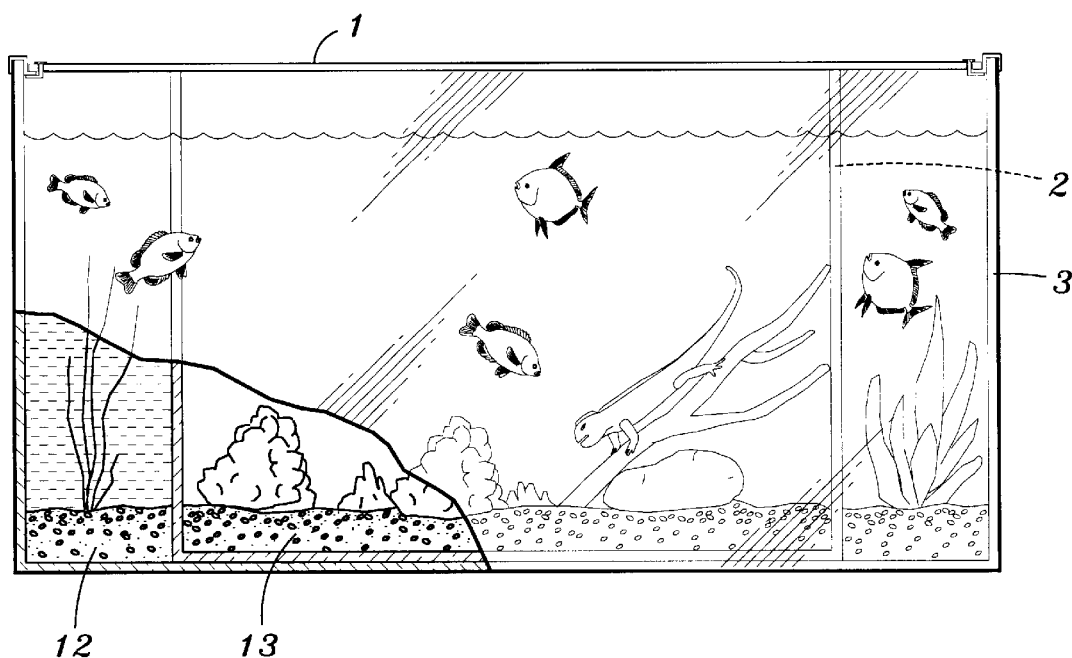
FIG. 4 shows a frontal view of a combination aquarium and terrarium in which the terrarium 2 is dimensioned so that the bottom of the terrarium abuts against the bottom of the aquarium tank 3 when held in place by the containment lid 1. The relationship between the level of aquarium gravel 12 and the inert material contained within the terrarium 13 may be clearly seen in this view.

FIG. 4 illustrates the special case in which a terrarium has been selected that is dimensioned so that the bottom of the terrarium 2 abuts against the bottom of the aquarium tank 3 when the terrarium is secured in place by the containment lid 1. By spreading aquarium gravel 12 about the area defined by the inside periphery of the aquarium tank and the outside periphery of the terrarium so that the top of the gravel layer coincides with the top of the layer of inert material contained within the terrarium 13, an illusion of continuity is presented whereby the terrestrial life contained within the terrarium appears to commingle with marine life contained within the aquarium.

The terrarium may be removed for cleaning or replacement by another terrarium by first loosening the thumbnuts, retracting the latches and removing the containment lid.

Figure 5:
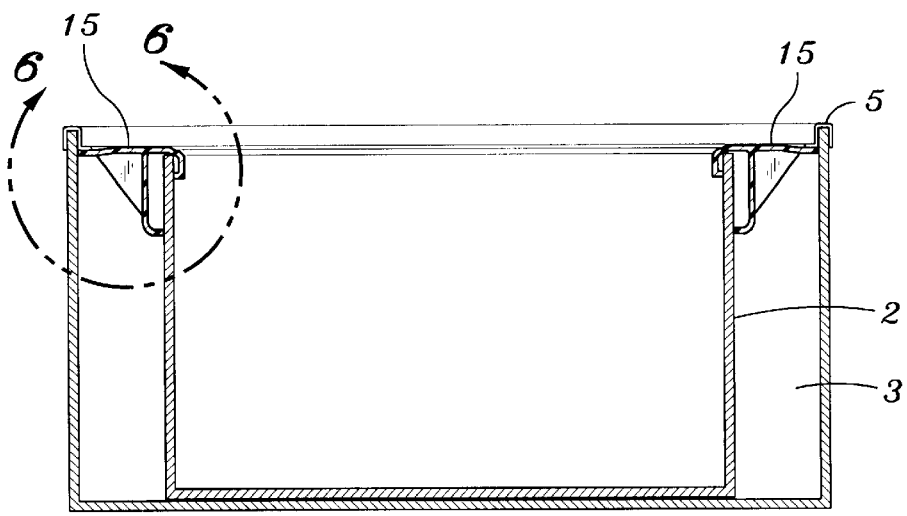
FIG. 5 shows an alternate embodiment in which a terrarium 2 is enclosed within a standard ten-gallon aquarium tank 3. The channel shaped band 5 that envelops and secures the top of the tank is shown, and two rigid clips 15 are seen mounted on opposite sides of the terrarium.

An alternate embodiment is shown in FIG. 5. Two rigid clips 15 are separately mounted on opposing top edges of the terrarium 2. When the terrarium is placed in a ten-gallon aquarium tank 3 containing water, the buoyancy of the terrarium causes each rigid clip to abut against the lower surface of the channel lip 5, thereby fixing the terrarium in place within the aquarium.

Figure 6:
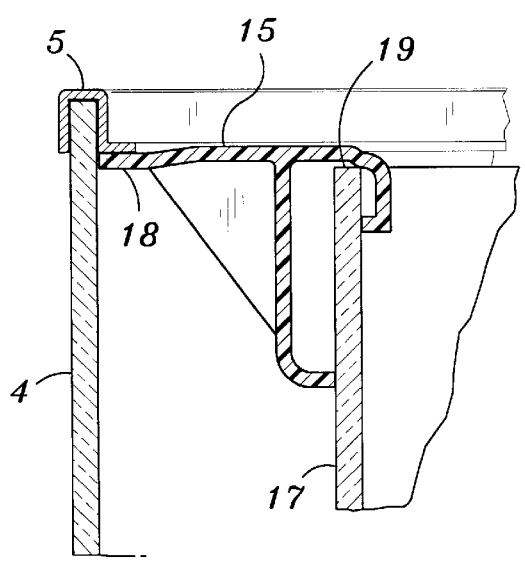
FIG. 6 shows a cutaway view of a typical side 4 of the aquarium tank 3, the channel shaped band 5, a rigid clip 15, and a typical side 17 of the terrarium 2. Here, the manner in which a rigid clip engages a top edge 19 of the terrarium may be seen. Also shown is a projecting tab 18 as it abuts against the lower surface of the channel lip.

FIG. 6 shows how a rigid clip 15 is positioned over the top edge of the terrarium. The rigid clip includes a rectangularly shaped tab 18 that projects at right angles away from the outer vertical side of the terrarium 2. Each projecting tab comprises a flat surface that is parallel to the top of the terrarium. The projecting tab is dimensioned so that the upper surface of the tab will abut against the lower surface of the channel lip 5 thereby fixing the terrarium in place. The edge of the projecting tab that mounts over the terrarium is shaped to form a cincture 22 that is dimensioned to engage the top edge 19 of the terrarium. The rigid clip further comprises a rectangularly shaped support bracket 20 that is perpendicular to the projecting tab, parallel to the adjacent vertical side of the terrarium, and terminates in a lip 23 that abuts against an adjacent vertical side 17 of the terrarium. The lip cooperates with the cincture to fix the rigid clip in place. Further included is a triangularly shaped reinforcing gusset 21 that prevents the rigid clip from deforming under pressure.

Figure 7:
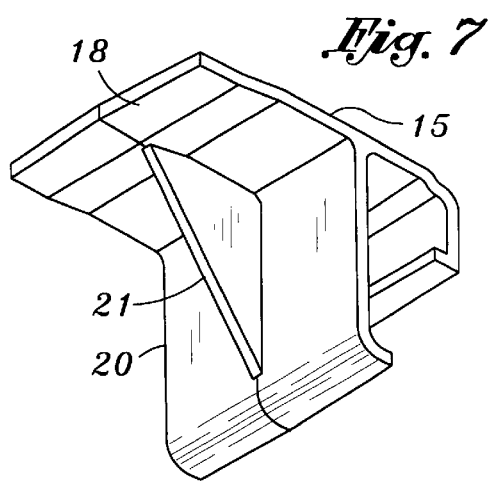
FIG. 7 shows a rigid clip 15 as viewed from the bottom. Here the relationship between the projecting tab 18, the support bracket 20, and the reinforcing gusset 21 may be seen.

FIG. 7 shows a rigid clip 15 as viewed from the bottom, further illustrating the relationship between the projecting tab, the support bracket, and the reinforcing gusset.

Figure 8:
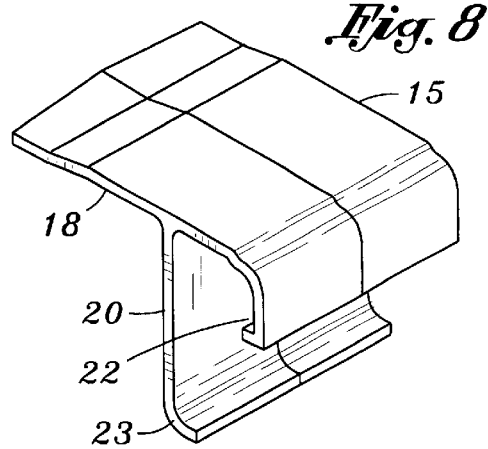
FIG. 8 shows a rigid clip as viewed from the top. In this view, the manner in which the projecting tab 18 is shaped to form a cincture 22 that encompasses the top edge of the terrarium may be seen. Also seen is the manner in which the lower edge of the support bracket 20 is shaped to form a lip 23 that abuts against the vertical side of the terrarium.

FIG. 8 views the rigid clip from the top. Here the cincture 22 may be seen, and the lip 23 that cooperates with the cincture to hold the rigid clip 15 in place.

Another embodiment, not shown, comprises a twenty-nine gallon tank having a channel shaped band, and a terrarium enclosed within. For this embodiment, four rigid clips are required, one mounted on each side of the terrarium. In all other respects, this embodiment functions the same as the ten-gallon ensemble.

Based on the description of FIGS. 1, 2, 3 and 4, it can be seen that this invention provides a combination aquarium and terrarium whereby a simultaneous viewing of marine and terrestrial life is possible.

Although the description above contains many specifications, these should not be construed as limiting the scope of the invention, but as merely providing illustrations of some of the presently preferred embodiments of this invention. For example, the terrarium could be of any shape or size that can be contained within the aquarium.

What is claimed is:

1. A combination aquarium and terrarium comprising a standard ten-gallon aquarium tank containing water, including a channel shaped band and channel lip facing the interior of the tank; a physically smaller terrarium having vertical sides, a top and top edges; and two rigid clips separately mounted on opposing top edges of the terrarium, each rigid clip comprising a rectangularly shaped tab having edges and projecting at right angles away from the outer vertical sides of the terrarium, said projecting tab having a flat surface that is parallel to the top of the terrarium and dimensioned so that the upper surface of the tab will abut against the lower surface of the channel lip, so that when the terrarium is placed within the aquarium tank, the buoyancy of the terrarium will cause the projecting tabs to abut against the lower surface of the channel lip, thereby fixing the terrarium in place within the aquarium tank.

2. The projecting tab of claim 1, further including an edge that mounts over the top of the terrarium and shaped to form a cincture that is dimensioned to engage the top edge of the terrarium.

3. The rigid clip of claim 1, further including a rectangularly shaped support bracket that is perpendicular to the projecting tab, parallel to the adjacent vertical side of the terrarium, and terminates in a lip that abuts against an adjacent vertical side of the terrarium, said lip cooperating with the cincture to fix the rigid clip in place.

4. The rigid clip of claim 1 further including a triangularly shaped reinforcing gusset that prevents the rigid clip from deforming under pressure.

5. A combination aquarium and terrarium comprising a standard twenty-nine gallon aquarium tank containing water, including a channel shaped band and channel lip facing the interior of the tank; a physically smaller terrarium having vertical sides, a top and top edges; and four rigid clips separately mounted on each top edge of the terrarium, each rigid clip comprising a rectangularly shaped tab having edges and projecting at right angles away from the outer vertical sides of the terrarium, said projecting tab having a flat surface that is parallel to the top of the terrarium and dimensioned so that the upper surface of the tab will abut against the lower surface of the channel lip, so that when the terrarium is placed within the aquarium tank, the buoyancy of the terrarium will cause the projecting tabs to abut against the lower surface of the channel lip, thereby fixing the terrarium in place within the aquarium tank.

6. The projecting tab of claim 5, further including an edge that mounts over the top of the terrarium and shaped to form a cincture that is dimensioned to engage the top edge of the terrarium.

7. The rigid clip of claim 5, further including a rectangularly shaped support bracket that is perpendicular to the projecting tab, parallel to the adjacent vertical side of the terrarium, and terminates in a lip that abuts against an adjacent vertical side of the terrarium, said lip cooperating with the cincture to fix the rigid clip in place.

8. The rigid clip of claim 5 further including a triangularly shaped reinforcing gusset that prevents the rigid clip from deforming under pressure.

\* \* \* \* \*